US012428281B2

(12) United States Patent
Shukla et al.

(10) Patent No.: US 12,428,281 B2
(45) Date of Patent: Sep. 30, 2025

(54) BULK INGREDIENT BATCHING

(71) Applicant: NIAGARA BOTTLING, LLC, Diamond Bar, CA (US)

(72) Inventors: Abhishek Shukla, Chino Hills, CA (US); Steven Kuo-Chuan Chen, Fountain Valley, CA (US)

(73) Assignee: Niagara Bottling, LLC, Diamond Bar, CA (US)

( * ) Notice: Subject to any disclaimer, the term of this patent is extended or adjusted under 35 U.S.C. 154(b) by 126 days.

(21) Appl. No.: 18/324,756

(22) Filed: May 26, 2023

(65) Prior Publication Data

US 2023/0382706 A1 Nov. 30, 2023

Related U.S. Application Data

(60) Provisional application No. 63/346,229, filed on May 26, 2022.

(51) Int. Cl.

| | |
|---|---|
| ***B67C 3/20*** | (2006.01) |
| ***B67C 3/22*** | (2006.01) |

(52) U.S. Cl.

CPC ................ *B67C 3/204* (2013.01); *B67C 3/22* (2013.01); *B67C 2003/226* (2013.01)

(58) Field of Classification Search

CPC ...... B67C 3/22; B67C 3/204; B67C 2003/226

See application file for complete search history.

(56) References Cited

U.S. PATENT DOCUMENTS

| | | | |
|---|---|---|---|
| 3,607,303 | A | 9/1971 | Bingham |
| 3,608,869 | A | 9/1971 | Woodle |
| 3,938,537 | A | 2/1976 | Kalko et al. |
| 4,313,370 | A | 2/1982 | Skoli et al. |
| 4,599,239 | A | 7/1986 | Wieland et al. |
| 4,632,275 | A | 12/1986 | Parks |

(Continued)

FOREIGN PATENT DOCUMENTS

| | | | |
|---|---|---|---|
| CN | 112591697 | A | 4/2021 |
| WO | 1999041002 | A2 | 8/1999 |

(Continued)

OTHER PUBLICATIONS

International Search Report and Written Opinion for Application No. PCT/US2023/067569 dated Nov. 7, 2023 (17 pages).

(Continued)

*Primary Examiner* — Timothy L Maust

(74) *Attorney, Agent, or Firm* — Michael Best & Friedrich LLP

(57) ABSTRACT

A production line for bottling a liquid product includes an ingredient preparation and batching system. The ingredient preparation and batching system includes a pre-mix station including a holding tank configured to store a hydrated ingredient. The ingredient preparation and batching system also includes a batch tank fluidly coupled to the pre-mix station and configured to receive a predetermined quantity of the hydrated ingredient from the holding tank. The production line also includes a bottling line fluidly coupled to the batch tank and configured to receive a batch of the liquid product from the batch tank and dispense the batch of the liquid product into a plurality of containers.

9 Claims, 2 Drawing Sheets

(56) References Cited

U.S. PATENT DOCUMENTS

| | | | |
|---|---|---|---|
| 4,964,732 A | 10/1990 | Cadeo et al. | |
| 5,068,116 A | 11/1991 | Gibney et al. | |
| 5,314,703 A | 5/1994 | Gibney et al. | |
| 5,537,914 A | 7/1996 | Gibney et al. | |
| 5,551,486 A * | 9/1996 | Hauser .................. B29B 7/7471 141/94 | |
| 5,552,171 A | 9/1996 | Gibney et al. | |
| 5,592,940 A * | 1/1997 | Kampfe .............. A61M 31/005 600/431 | |
| 5,656,313 A | 8/1997 | Gibney et al. | |
| 5,918,768 A | 7/1999 | Ford | |
| 6,186,193 B1 * | 2/2001 | Phallen ..................... B65B 3/30 222/64 | |
| 6,280,075 B1 | 8/2001 | Cadeo | |
| 6,615,880 B2 * | 9/2003 | Hewlitt .................... B67D 7/74 141/105 | |
| 7,013,933 B2 * | 3/2006 | Sher ........................ A47J 31/41 99/309 | |
| 8,571,881 B2 * | 10/2013 | Rousso ............... A61M 5/1782 600/431 | |
| 2003/0211204 A1 | 11/2003 | Fields et al. | |
| 2009/0280229 A1 | 11/2009 | Constantine et al. | |
| 2011/0064862 A1 | 3/2011 | McCready | |
| 2013/0071527 A1 | 3/2013 | Pesce et al. | |
| 2013/0112081 A1 | 5/2013 | Nelissen et al. | |
| 2015/0031764 A1 | 1/2015 | Kraus et al. | |
| 2015/0374609 A1 | 12/2015 | Cetti et al. | |
| 2016/0000103 A1 | 1/2016 | Oestengaard | |
| 2016/0296060 A1 | 10/2016 | Palsson | |
| 2017/0273327 A1 | 9/2017 | Laplante et al. | |
| 2018/0035841 A1 | 2/2018 | Savino | |
| 2018/0354770 A1 | 12/2018 | Cacciatore et al. | |
| 2020/0022390 A1 | 1/2020 | Caruso et al. | |

FOREIGN PATENT DOCUMENTS

| | | |
|---|---|---|
| WO | 1999048387 A1 | 9/1999 |
| WO | 2009137332 A2 | 11/2009 |

OTHER PUBLICATIONS

Maldonado, M., et al. "A study of different subsequence elimination strategies for the soft drink production planning." Journal of applied research and technology 12.4 (2014): 631-641.

Chikumbirike, M. O., et al. "Design of an automated monitoring and control system for the soft drink capping machine and process mixer." South African Journal of Industrial Engineering 32.3 (2021): 225-237.

International Search Report and Written Opinion for Application No. PCT/US2024/010162 dated May 30, 2024 (10 pages).

International Search Report and Written Opinion for Application No. PCT/US2024/048209 dated Feb. 14, 2025 (15 pages).

* cited by examiner

BULK INGREDIENT BATCHING

CROSS-REFERENCE TO RELATED APPLICATIONS

This application claims priority to U.S. Provisional Patent Application No. 63/346,229, filed May 26, 2022, the entire content of which is hereby incorporated by reference.

FIELD

The present disclosure relates to the bottling of liquid products, and more particularly to the preparation of ingredients prior to bottling of the liquid products.

BACKGROUND

Ingredients for the bottling of liquid products are typically manually combined prior to introduction into a bottling line. The manual combination of ingredients creates a batch that can be tested for quality and tracked by the bottler to ensure the proper combination of ingredients. The manual batching process is subject to operator error and can be inefficient. Furthermore, it is possible for a bottling line, which fills bottles with the combined ingredients, to utilize the batch of ingredients faster that a new batch can be made by the manual process. A faster batching technique (e.g., ingredient combination technique) is therefore needed to maintain pace with the bottling line and avoid pauses in production.

SUMMARY

The present disclosure provides, in one aspect, a production line for bottling a liquid product. The production line includes an ingredient preparation and batching system. The ingredient preparation and batching system includes a pre-mix station including a holding tank configured to store a hydrated ingredient. The ingredient preparation and batching system also includes a batch tank fluidly coupled to the pre-mix station and configured to receive a predetermined quantity of the hydrated ingredient from the holding tank. The production line also includes a bottling line fluidly coupled to the batch tank and configured to receive a batch of the liquid product from the batch tank and dispense the batch of the liquid product into a plurality of containers.

The present disclosure provides, in another aspect, an ingredient preparation and batching system for use with a liquid bottling line. The ingredient preparation and batching system includes a first pre-mix station including a first holding tank configured to store a first hydrated ingredient. The ingredient preparation and batching system also includes a second pre-mix station including a second holding tank configured to store a second hydrated ingredient different from the first hydrated ingredient. The ingredient preparation and batching system further includes a batch tank fluidly coupled to the first pre-mix station and the second pre-mix station. The batch tank is configured to receive a predetermined quantity of the first hydrated ingredient from the first holding tank. The batch tank is also configured to receive a predetermined quantity of the second hydrated ingredient from the second holding tank. The batch tank is further configured to store a batch of a liquid product comprising the first hydrated ingredient and the second hydrated ingredient.

The present disclosure provides, in yet another aspect, a method of preparing a batch of a liquid product for a bottling line. The method includes hydrating a major ingredient at a pre-mix station to produce a hydrated major ingredient. The method also includes storing the hydrated major ingredient in a holding tank of the pre-mix station. The method further includes conveying the hydrated major ingredient from the holding tank to a batch tank. The method also includes combining the hydrated major ingredient with a minor ingredient within the batch tank to produce a batch.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Liquid products, such as isotonic, high-acid beverages, are dispensed into individual bottles by a bottling line which pulls pre-mixed ingredients from a batch tank to fill the bottles. Prior to the filling process, a manual batching process is used to pre-mix the ingredients based on a supplied recipe. The pre-mixed ingredients (i.e., the batch) are stored in the batch tank until bottling. The manual batching process involves at least one operator combining multiple ingredients based on the recipe. The ingredients must be manually weighed and mixed into the batch to allow for testing and to ensure the quality and safety of the end product.

In some instances, the bottling lines used to bottle the batch of ingredients can utilize an aseptic line which operates at a high rate of speed. For example, the bottling line may be capable of filling around 66,000 bottles per hour. When such a high speed bottling line is used, it is possible for the bottling line to deplete the batch of pre-mixed ingredients before the operators can prepare a new batch. Much of the time required to prepare the new batch is spent measuring (e.g., weighing) the ingredients to be included. The present disclosure improves the batching process by preparing some ingredients in bulk and supplying the ingredients quickly and accurately to the batch tank.

Recipes for liquid products to be bottled include major and minor ingredients. Major ingredients are common to a number of different recipes (e.g., citric acid or sugar (e.g., sucrose, dextrose, etc.)). Minor ingredients are specific to a certain recipe (e.g., coloring additive). Recipes typically have greater quantities of major ingredients than minor ingredients. The terms major and minor refer only to the above-described categories of ingredients and not to the importance of any individual ingredient in a recipe. The present disclosure provides a system for decoupling the preparation of major ingredients and minor ingredients to more efficiently prepare a batch.

Figure 1:
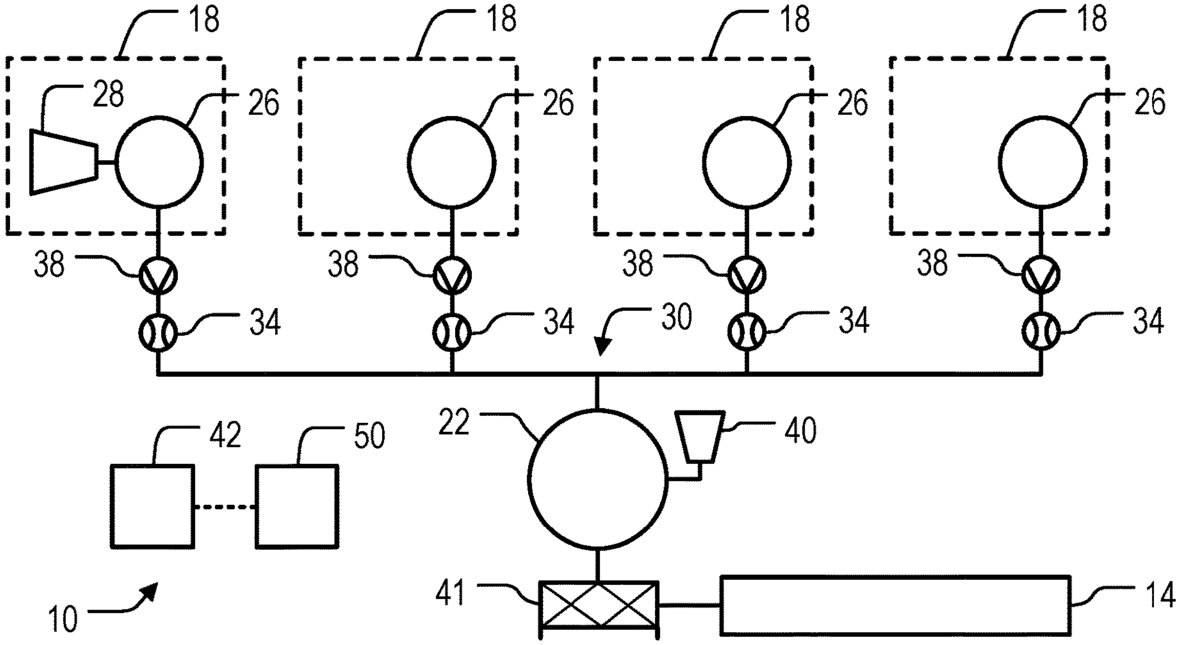
FIG. 1 is a schematic illustrating an ingredient preparation and batching system according to one embodiment of the present disclosure.

FIG. 1 is a schematic illustrating an ingredient preparation and batching system 10 according to one embodiment of the present disclosure. The ingredient preparation and batching system 10 allows the batching process to keep pace with a high speed bottling line 14. In particular, the ingredient preparation and batching system 10 includes a plurality of major ingredient pre-mix stations 18 fluidly coupled to at least one batch tank 22. The number of major ingredient pre-mix stations 18 is dependent upon the number of major ingredients that are common to the recipes being bottled. In the present embodiment, the system 10 of FIG. 1 includes four major ingredient pre-mix stations 18. The embodiment of FIG. 1, however, is provided as an example and it should be understood that fewer (e.g., three, two, or even one pre-mix station) or more than four pre-mix stations are also contemplated. Each major ingredient pre-mix station 18 is fluidly coupled to the batch tank 22. The batch tank 22 is fluidly coupled to the bottling line 14 to distribute the batch into individual bottles.

With continued reference to FIG. 1, each major ingredient pre-mix station 18 includes a holding tank 26. In some embodiments, the pre-mix stations 18 further include a mixer 28 operable to mix (or, dissolve) the major ingredient into water to produce a hydrated major ingredient. The holding tank 26 stores a relatively large quantity (e.g., a quantity sufficient for more than one batch) of a major ingredient in a hydrated state. In other words, each holding tank 26 holds a single major ingredient in a fluid form at a designated concentration. The use of individual holding tanks 26 allows each major ingredient to be traced and tested for quality and safety, and allows for individual control over each ingredient in a recipe.

An arrangement of pipes 30 couples each holding tank 26 to the batch tank 22. The system 10 also includes one or more flow meters 34 (e.g., mass flow meters) disposed at one or more locations within the arrangement of pipes 30 and adapted to detect a flow rate within the pipes 30. Each holding tank 26 is further coupled to at least one pump 38 via the arrangement of pipes 30 to convey the hydrated major ingredient from the holding tank 26 to the batch tank 22. The flow meters 34 measure the quantity of hydrated major ingredient that is transferred from the holding tank 26 to the batch tank 22 so that the system 10 can ensure proper adherence to the recipe.

In the illustrated embodiment, the system 10 also includes a hopper 40 fluidly coupled to the batch tank 22. The hopper 40 can receive one or more minor ingredients and dispense predetermined quantities of the one or more minor ingredients contained therein into the batch tank 22 for mixing into the batch according to the recipe. In other embodiments, the hopper 40 can be uncoupled from the batch tank 22, and the minor ingredients contained therein can be manually measured and added into the batch tank 22 during the batching process.

With continued reference to FIG. 1, the system 10 further includes a heat treatment apparatus 41 fluidly coupled to the batch tank 22. The system 10 conveys a prepared batch from the batch tank 22 to the heat treatment apparatus 41 prior to bottling at the bottling line 14. The heat treatment apparatus 41 heat treats the prepared batch (e.g., via a pasteurization process, an ultra-high temperature (UHT) treatment process, or the like).

The system 10 also includes a user interface 42 operable to receive user input and display information relating to control of the system 10. Via the user interface 42, the user may input, retrieve, or modify at least one recipe for at least one consumable liquid product. The user interface 42 is operable to communicate the recipe to a controller 50 that is electrically coupled to the user interface 42, the pumps 38, and the flow meters 34. The controller 50 is operable to convey, via the pumps 38, a predetermined quantity of each major ingredient (i.e., based on the recipe) into the batch tank 22. The controller 50 is further operable to monitor the flow meters 34 during the pumping process to ensure an accurate amount of each major ingredient is supplied to the batch tank 22. The controller 50 is also electrically coupled to the hopper 40 and operable to dispense, via the hopper 40, a predetermined quantity of minor ingredients into the batch tank 22 according to the recipe.

To create a new batch for bottling, the operator first selects the desired recipe via the user interface 42 and initiates a batching process. The controller 50 then actuates the pumps 38 and flow meters 34 to convey predetermined quantities of each hydrated major ingredient from the holding tanks 26 to the batch tank 22. In the illustrated embodiment, the controller 50 also actuates the hopper 40 to dispense predetermined quantities of the minor ingredients into the batch tank 22. In other embodiments where the hopper 40 is uncoupled from the batch tank 22, the operator manually adds the minor ingredients to the batch tank 22. The hydrated major ingredients and the minor ingredients are mixed in the batch tank 22 (e.g., via jet mixing) to create a batch. The operator may then test the batch for quality and accuracy as compared to the recipe. At this point, a new batch has been created and is ready for bottling. The process of creating a new batch with the ingredient preparation and batching system 10 described above is more efficient and requires less operator input than the traditional manual batching process. The above-described system 10 requires between 30 and 60 minutes to complete the mixing of a new batch. More particularly, the system can create a new batch in about 40 minutes and is 30%-40% more efficient than a manual batching process. The ingredient preparation and batching system 10 is capable of creating a new batch in less time than the bottling line 14 requires to deplete the entire previous batch.

The increased efficiency of this system is realized (at least in part) by decoupling the preparation of the major ingredients from the end stage mixing of the overall batch. By utilizing pre-mix stations 18 with holding tanks 26 that are separated from the batch tank 22, to the system 10 is able to continuously prepare the major ingredients independently of one another and of the final batch preparation process. When the batch tank 22 is ready to receive the ingredients for a batch, the system 10 conveys predetermined quantities of each hydrated major ingredient from the dedicated holding tanks 26 quickly (via the pumps 38) on demand (i.e., with no delay for major ingredient preparation). The system 10 does not require an operator to individually weigh and mix each ingredient at the time of batching.

Figure 2:
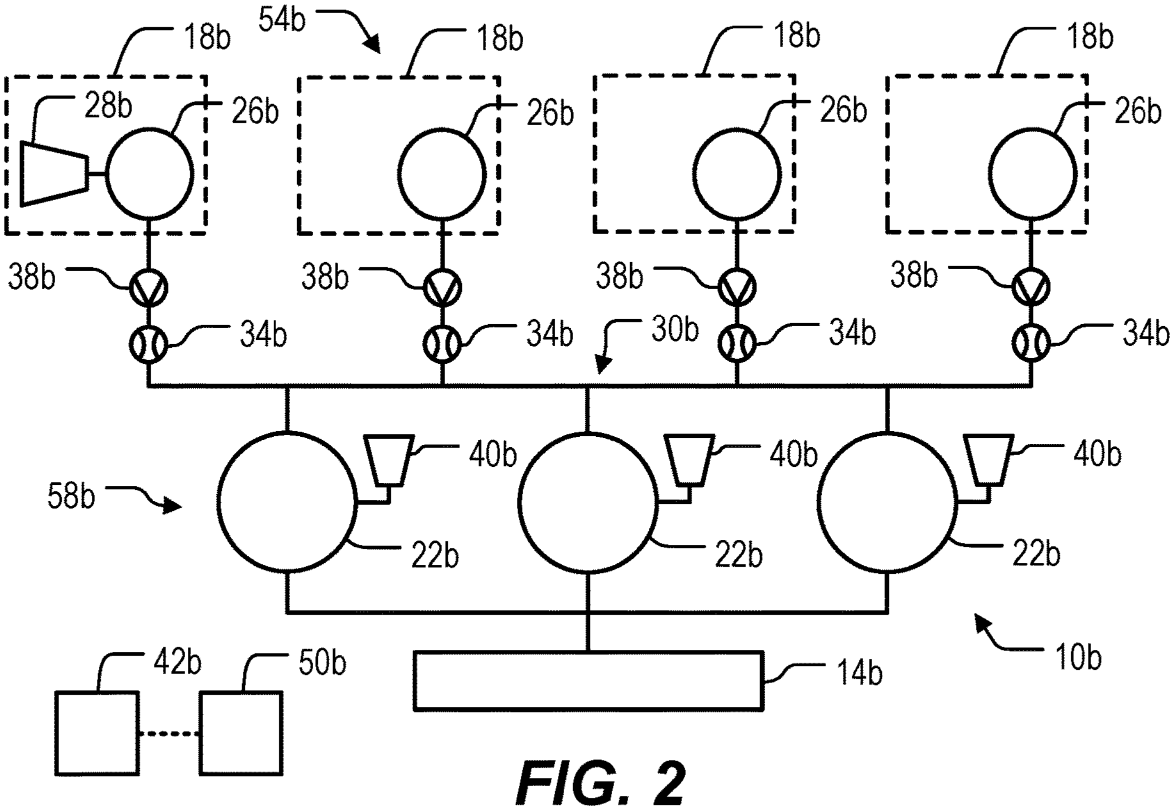
FIG. 2 is a schematic illustrating an ingredient preparation and batching system according to another embodiment of the present disclosure.
Figure 3:
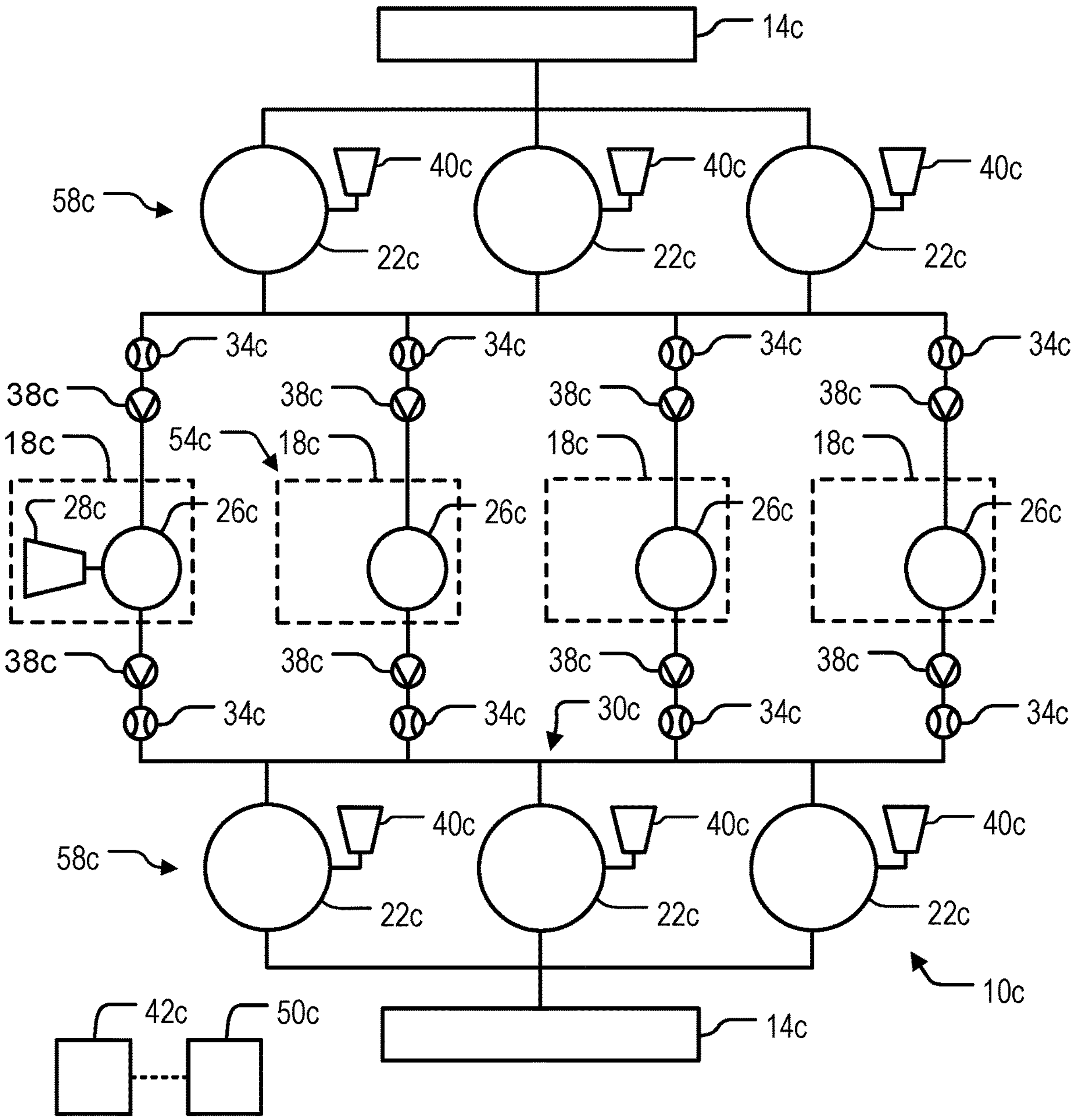
FIG. 3 is a schematic illustrating an ingredient preparation and batching system according to yet another embodiment of the present disclosure.

The ingredient preparation and batching system 10 as described above is scalable based on the number of major ingredients shared by recipes, the number of batch tanks 22 needed for each recipe, and the number of bottling lines 14 available. FIGS. 2 and 3 are schematics illustrating further embodiments of the ingredient preparation and batching system, with like features having like reference numerals plus the letters "b" and "c" respectively, and having the following differences. FIG. 2 illustrates an ingredient preparation and batching system 10*b* in which one holding tank set 54*b*, having four holding tanks 26*b*, is fluidly coupled to a batch tank set 58*b* having a plurality of batch tanks 22*b*. Each batch tank 22*b* is fluidly coupled to the same bottling line 14*b*. The plurality of batch tanks 22*b* are adapted to hold batches of the same or different recipes. When the batch tanks 22*b* hold batches of the same recipe, the bottling line 14*b* can quickly shift to another batch tank 22*b* when the batch in one batch tank 22*b* is depleted.

FIG. 3 illustrates an ingredient preparation and batching system 10*c* in which one holding tank set 54*c*, having four holding tanks 26*c*, is fluidly coupled to two batch tank sets 58*c*. Each batch tank set 58*c* includes three batch tanks 22*c*, and each batch tank set 58*c* is fluidly coupled to a different respective bottling line 14*c*. Each batch tank set 58*c* holds batches of a different recipe, while each batch tank 22*c* within a batch tank set 58*c* holds a batch of the same recipe. Therefore, the ingredient preparation and batching system 10*c* is capable of creating batches of various recipes and providing the batches to two distinct bottling lines 14*c*.

Although the disclosure has been described in detail with reference to preferred implementations, variations and modifications exist within the scope and spirit of one or more independent aspects of the disclosure as described. More particularly, one of ordinary skill in the art will understand the scalability of the above-described ingredient preparation and batching system. The system is scalable to accommodate any number of desired production lines.

Various features of the disclosure are set forth in the following claims.

What is claimed is:

1. An ingredient preparation and batching system for use with a beverage liquid bottling line, the ingredient preparation and batching system comprising:

a first pre-mix station including a first holding tank configured to permit hydration of a first ingredient of a beverage therewithin and store the first hydrated ingredient, wherein the first ingredient comprises an ingredient selected from a group consisting of sucrose, dextrose, and citric acid;

a second pre-mix station including a second holding tank configured to permit hydration of a second ingredient of the beverage therewithin and store the second hydrated ingredient, wherein the second ingredient is different from the first ingredient; and a batch tank fluidly coupled to the first pre-mix station and the second pre-mix station, the batch tank configured to receive a predetermined quantity of the first hydrated ingredient from the first holding tank, receive a predetermined quantity of the second hydrated ingredient from the second holding tank, and store a batch of the beverage including at least the first hydrated ingredient and the second hydrated ingredient.

2. The ingredient preparation and batching system of claim 1, further comprising a third pre-mix station including a third holding tank configured to store a third hydrated ingredient different from the first hydrated ingredient and the second hydrated ingredient, wherein the batch tank is further configured to receive a predetermined quantity of the third hydrated ingredient from the third holding tank.

3. The ingredient preparation and batching system of claim 1, further comprising a flow meter configured to detect a flow rate of the first hydrated ingredient received into the batch tank.

4. The ingredient preparation and batching system of claim 3, further comprising a pump configured to convey the first hydrated ingredient from the first holding tank to the batch tank.

5. The ingredient preparation and batching system of claim 4, further comprising a controller in electrical communication with the pump and the flow meter, the controller configured to operate the pump and the flow meter to convey the predetermined quantity of the first hydrated ingredient from the first holding tank to the batch tank.

6. The ingredient preparation and batching system of claim 5, further comprising a user interface in electrical communication with the controller and configured to communicate a recipe of the beverage to the controller.

7. The ingredient preparation and batching system of claim 1, further comprising a hopper fluidly coupled to the batch tank and configured to dispense a predetermined quantity of a minor ingredient into the batch tank.

8. The ingredient preparation and batching system of claim 1, wherein:

the first pre-mix station further includes a mixer configured to mix the major ingredient with water to produce the first hydrated ingredient.

9. A production line for bottling a liquid product, the production line comprising:

the ingredient preparation and batching system of claim 1; and a bottling line fluidly coupled to the batch tank and configured to receive a batch of the beverage from the batch tank and dispense the batch of the beverage into a plurality of containers.

* * * * *